US012631541B2

(12) United States Patent　　(10) Patent No.:　US 12,631,541 B2

Alia et al.　　　　　　　　　　　(45) Date of Patent:　　May 19, 2026

(54) ACOUSTIC PARTICLE COUNTER FOR NANOPARTICLES IN LIQUIDS

(71) Applicant: Ovivo Inc., Montreal (CA)

(72) Inventors: Najib Alia, Weil-am-Rhein (DE); Ian Briggs, Basel (CH); Philippe Rychen, Muespach-le-haut (FR)

(73) Assignee: Ovivo Inc., Montreal (CA)

( * ) Notice: Subject to any disclaimer, the term of this patent is extended or adjusted under 35 U.S.C. 154(b) by 330 days.

(21) Appl. No.: 18/221,263

(22) Filed: Jul. 12, 2023

(65) Prior Publication Data

US 2025/0020566 A1　　Jan. 16, 2025

(51) Int. Cl.
　*G01N 15/10*　　　(2024.01)
　*G01N 15/00*　　　(2024.01)

(52) U.S. Cl.
　CPC ..... *G01N 15/10* (2013.01); *G01N 2015/0038* (2013.01); *G01N 2015/0053* (2013.01); *G01N 2015/1024* (2024.01)

(58) Field of Classification Search
　CPC ........... G01N 15/10; G01N 2015/1024; G01N 2015/0038; G01N 2015/0053
　See application file for complete search history.

(56) References Cited

U.S. PATENT DOCUMENTS

| | | | |
|---|---|---|---|
| 3,710,615 A | 1/1973 | Johnson et al. | |
| 5,410,403 A | * 4/1995 | Wells ................. | G01N 15/1404 |
| | | | 356/335 |
| 5,546,813 A | 8/1996 | Hastings et al. | |
| 5,594,165 A | * 1/1997 | Madanshetty ......... | G01N 15/06 |
| | | | 73/64.53 |
| 6,395,096 B1 | 5/2002 | Madanshetty | |
| 6,827,791 B2 | 12/2004 | Ruffa et al. | |
| 6,981,408 B1 | 1/2006 | Madanshetty | |
| 7,004,824 B1 | 2/2006 | Madanshetty | |
| 7,253,551 B2 | 8/2007 | Madanshetty | |
| 7,395,827 B2 | 7/2008 | Madanshetty | |
| 7,828,901 B2 | 11/2010 | Madanshetty | |
| 2004/0065160 A1 | 4/2004 | Povey et al. | |
| 2005/0056338 A1 | 3/2005 | Hertzler et al. | |
| 2006/0027254 A1 | 2/2006 | Madanshetty | |
| 2009/0009027 A1 | 1/2009 | Madanshetty | |

(Continued)

FOREIGN PATENT DOCUMENTS

WO　　　WO03099474　　　12/2003

*Primary Examiner* — Paul M. West
(74) *Attorney, Agent, or Firm* — Thomas M. Freiburger

(57)　　　　　ABSTRACT

In semiconductor manufacture requiring ultra high purity water, particles of specified sizes are detected using acoustic particle detection capable of detecting nanoparticles. A sensor unit receives a flow of water, with the pressure and rate of flow to the sensor controlled closely. In each sensor unit is a measurement cell to receive a continuous flow of water, with a transducer module engaged with the cell to deliver an acoustic pulse at a known level of intensity as the liquid flows through the cells, the acoustic pulse acting on the liquid at a focus zone to cause cavitation in the event a particle of size detectable at that intensity is present. A waveform emitter/receiver connected to the sensor unit sends high-frequency, high-voltage signal to the transducer module to cause the acoustic pulse, and it also receives a waveform echo indicating a cavitation event. The system is controlled by a microprocessor.

12 Claims, 4 Drawing Sheets

(56)                      References Cited

U.S. PATENT DOCUMENTS

| | | | |
|---|---|---|---|
| 2010/0110398 A1* | 5/2010 | De Graaf | ............ G03F 7/70916 |
| | | | 355/30 |
| 2022/0065824 A1 | 3/2022 | Silverman | |

* cited by examiner

30MHz

ACTIVE
DETECTOR
GENERATES
ACOUSTIC COAXING
FIELD

PASSIVE
DETECTOR

1MHz
CAVITATION
TRANSDUCER
GENERATES
MAIN CAVITATION FIELD

ACOUSTIC PARTICLE COUNTER FOR NANOPARTICLES IN LIQUIDS

BACKGROUND OF THE INVENTION

The manufacturing of semiconductors requires water and chemicals of high purity. The amount of particles in the size of a few nanometers is particularly critical, as the deposition of such particles on the surface of semiconductor wafer can cause wafer defects.

It is therefore essential to monitor and eliminate particles in the water before it is dispensed on the wafer. There are different types of metrologies to detect the number and size of particles of size<100 nm in a volume of water. The present invention belongs to the category of acoustic detectors because it uses ultrasound waves in the liquid medium. In particular, it is based on the Acoustic Coaxing Induced Microcavitation (ACIM) method which constitutes the prior art of the invention (see e.g. U.S. Pat. No. 7,395,827 to S. Madanshetty, 2007).

While the existing ACIM method can be theoretically used to detect nanoparticles in liquid medium, several obstacles are still to be overcome for a repeatable and reproducible online measurement: the dependency of the results on flow conditions, use of degassing accessories as a potential source of contamination, restricted measurement settings, and large footprint.

The cavitation-based estimation of particle concentration in a flowing medium depends not only on the parameters of the acoustic wave (such as its intensity) but also on the flow rate passing through the wave. In order to have consistent measurement, the flowrate and pressure conditions should be as steady as possible. This aspect is not taken into account in the prior art.

The prior art employs a liquid medium slightly under-pressurized to force gas pockets out of particles and reduce cavitation thresholds. This solution is implemented in practice using an additional degassing setup. This degassing setup is typically composed of a pump, a degassing cell and additional tubing. All these components are potential sources of contamination of the liquid medium, thereby rendering the ACIM method for detecting liquid-borne particles in high purity water counter productive. While the theoretical approach is relevant, the practical implementation calls for a review of the approach.

The conventional ACIM method does not allow different cavitation conditions simultaneously. It is for example not possible to detect different sizes of particles or measure different samples simultaneously. One would require several devices to do so, which is impractical due to the current large footprint, including the degassing accessories and the controller. For example, for four size channels, one needs four controllers and four measurement setups. It would be beneficial to reduce the footprint of the ACIM method to allow the simultaneous use of several ACIM units to measure different particle sizes in the liquid medium.

In summary, it appears that the existing prior art for detection of nanoparticles in liquid medium suffers from some restrictions which limit its practical implementation and the consistency of its results.

SUMMARY OF THE INVENTION

The invention allows monitoring the purity of a continuously flowing liquid medium sample, by detecting the quantity and size of particles or impurities present in the liquid medium thanks to acoustic cavitation.

On the one hand, it is known from prior art that acoustic cavitation in bulk liquids occurs on nucleation seeds such as particles. The smaller the particle, the higher the tensile force required to overcome the local surface tension and generate cavitation. The relationship between the size of the particle and the required pressure to overcome the surface tension is given by the Laplace law:

$$P_L = 2\sigma/R$$

where $P_L$ is the Laplace pressure, $\sigma$, the surface tension of the liquid medium and R the particle radius. The detection of a cavitation event at a known acoustic pressure thus gives an indication of the size of the particle. On the other hand, the quantity of the particles can be determined by sending multiple acoustic pulses in the liquid medium and counting the cavitation events resulting from these pulses. Multiple pulses are sent because the water is flowing.

By controlling the intensity of the acoustic wave, and the flowrate of the liquid medium sample, so that these are known and constant, the invention allows to determine the size and concentration of sub-micron particles in the liquid medium.

There are two options to detect several particle sizes simultaneously: either the transducer sends successive pulses with different intensities, or one uses separate transducers in separate measurement cells, in parallel. The former solution requires long off-time and low duty cycles to allow for sample recovery and renewal between the pulses, especially between the high and the low intensities (corresponding to the small and big particle sizes respectively). In practice, it is more beneficial to have higher pulse rates for quicker and more accurate measurements. Therefore, the invention implements the second solution, using replicates of transducer and measurement cells with different acoustic parameters, in parallel flow paths.

The implementation of this solution is facilitated by a re-design of the power path: instead of having one controller for each transducer, the power generator is split into two parts: a general purpose power transformer from the mains switches to 24 VDC, and a waveform emitter/receiver (or waveform generator) module, which transforms the 24 VDC into the high-voltage high-frequency signal sent to the transducer. The waveform generator module is advantageously mounted in a compact box close to the transducer and is composed of the following functions:

- A DC-DC converter which converts the 24 VDC coming from the general purpose power transformer into the required voltage, followed by supply filters to store the energy and make it available at short notice
- A Class-D power amplifier half-bridge (or power switch) based on GaN (Gallium-Nitride) technology for energy-efficient and cost-efficient waveform generation
- A matching network to compensate the load impedance of the transducer and ensure thereby an optimal energy transmission (i.e. minimal energy loss) from the power switch to the transducer
- 3 components responsible for the reception of the signal (waveform sampler): i) a high-voltage switch which opens during the transmission of the high-voltage pulse to protect the amplifier and which closes afterwards to allow waveform listening (reception); ii) an amplifier to amplify the received signal from the transducer; and iii) an Analog-Digital-Converter (ADC) to convert the received signal into a digitized waveform A real-time processor (or microcontroller) to manage the control and timing of the different parts of the module (waveform generation, reception and interpretation)

Furthermore, since the accuracy of the measurement depends strongly on the stability of the liquid flowrate, the invention comprises a flow control system to dampen any variations coming from potential fluctuations of the liquid sample flow. The flow control is advantageously composed of a passive pressure reducing component—because active components might be a source of particle contamination of the sample line—and a bypass line to deviate excess sample flow. Such a flow control allows stable flow conditions ranging from a few mL/min to more than 1 L/min, depending on the preferred sampling time and liquid consumption. A typical value of 300 mL/min is considered to be an appropriate balance between these two criteria. The flowrate should be monitored with an accurate flow sensor. Combined with the controlled acoustic cavitation parameters, the stable flow improves the repeatability of the measurement.

In addition to the flowrate, the pressure of the liquid is also controlled to be slightly pressurized in the measurement cell (up to six bar, or about 87 psig, or more preferably a range of about 0.1 to 3 bar). This prevents the existence of free-floating bubbles, which can cavitate at much lower acoustic intensity threshold than actual particles, and thus be detrimental to the quality of the measurement. While it is known that a liquid under pressure might increase particle wetting and thus prevent cavitation, the cavitation thresholds in the scope of this invention are at least one order of magnitude higher than the liquid overpressure. The additional wetting of particles is thus easily overcome and is not a concern in this application.

In summary, the invention extends the basic measurement principle defined in prior art to monitor accurately and reproducibly the purity of a liquid medium.

DESCRIPTION OF PREFERRED EMBODIMENTS

Figure 1:
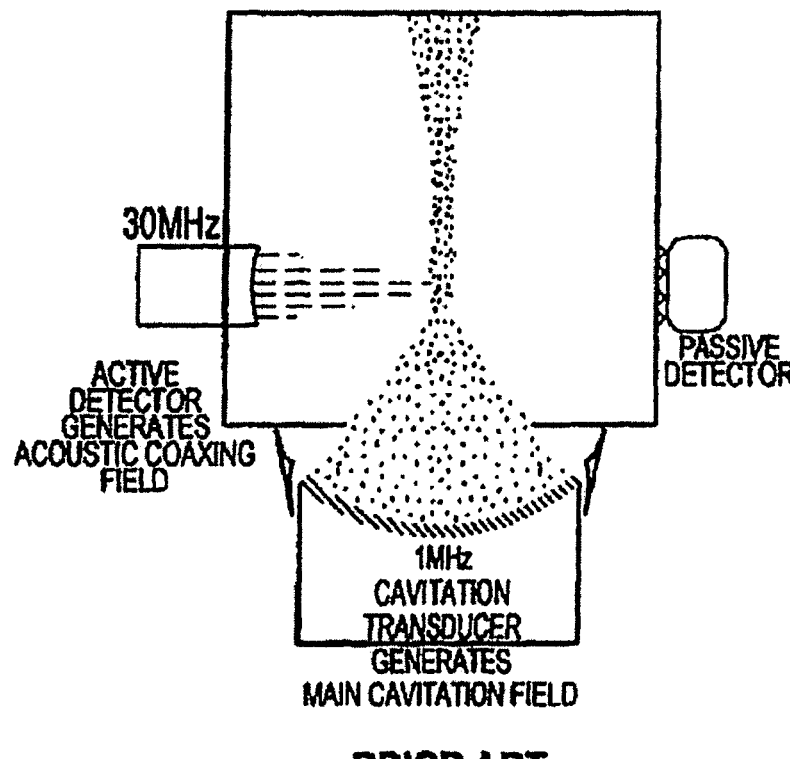
FIG. 1 is a schematic view showing prior art.
Figure 2:
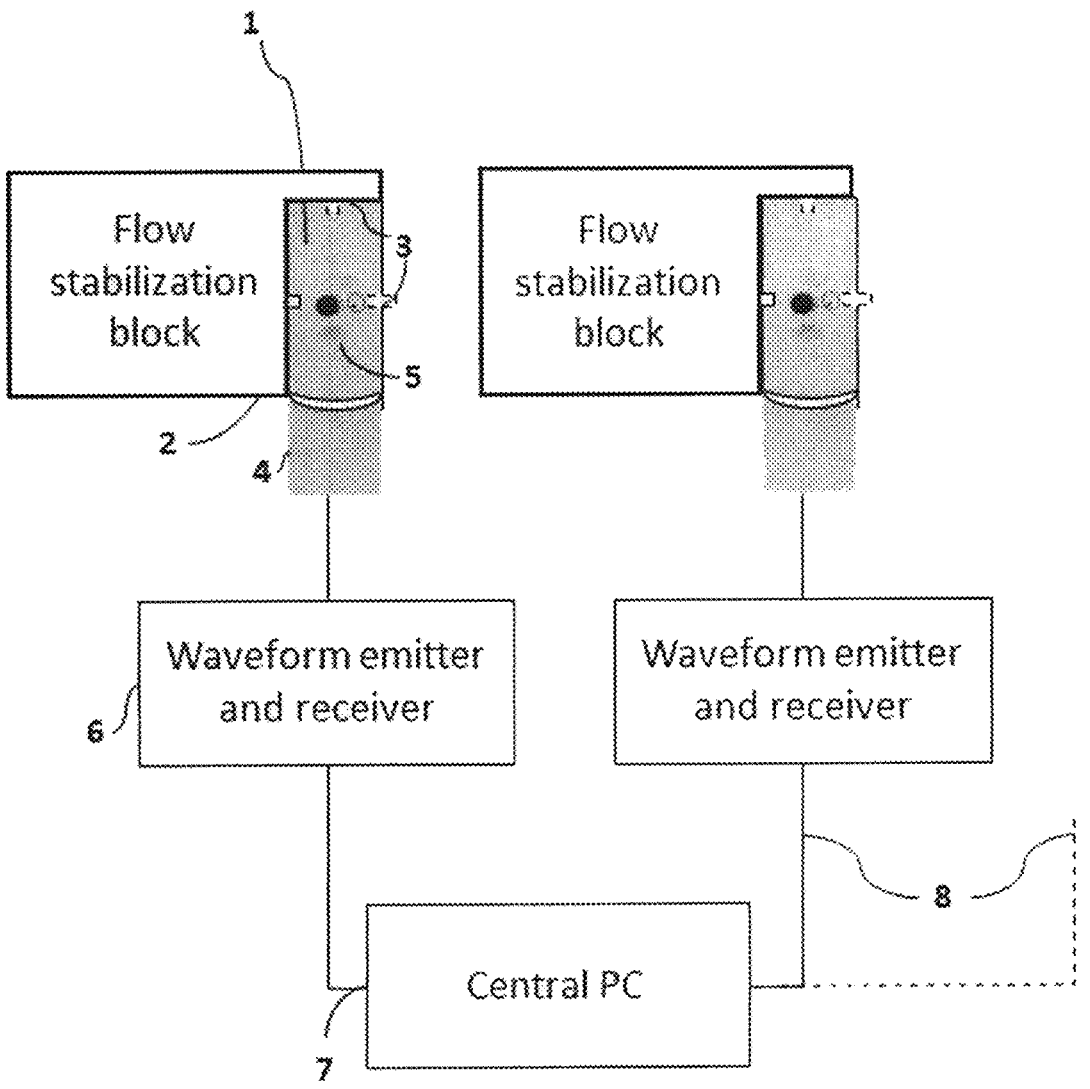
FIG. 2 is a schematic showing the invention with two parallel sensor units.
Figure 3:
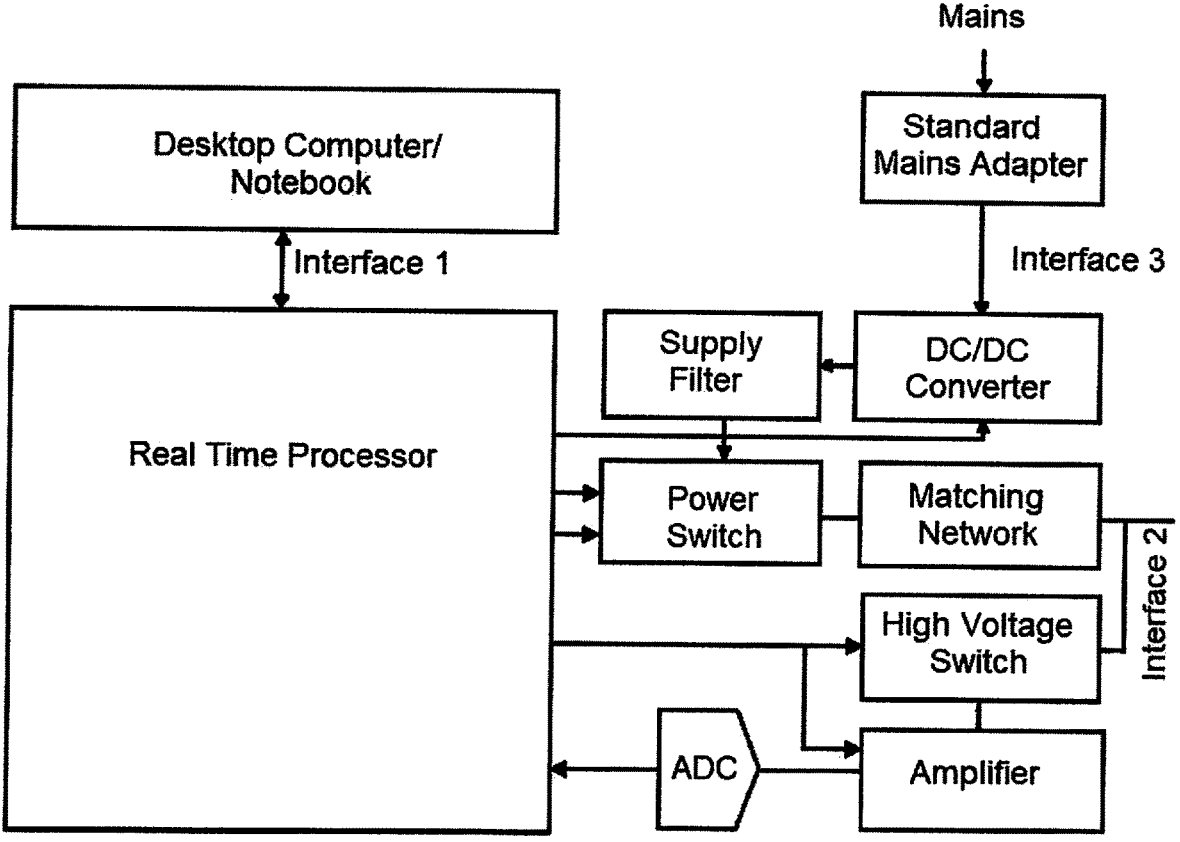
FIG. 3 is a schematic showing electronics of the invention.

The invention is composed of one or several sensor units, referring to FIG. 2, each composed of:

a measurement cell 1 with at least two openings 2 and 3 to let the liquid medium flow in and out a flow stabilization mechanism connected to the openings 2 and 3 of the measurement cell a transducer module 4 which generates high frequency and intensity focused ultrasound waves 5 a waveform generator and receiver module 6 connected to the transducer and a transmitter unit (or central PC) 7 which controls the individual sensor units.

The measurement is operated as follows:

1. The central PC 7 sets the acoustic parameters for each transducer depending on the medium and particle size to be measured 2. The waveform emitter/receiver module 6 sends the high-frequency high-voltage signal to the transducer 4

3. The transducer converts the voltage waveform into an acoustic pulse 5 transiting into the medium.

4. The acoustic wave reaches a maximum compressive and tensile intensities in the focus zone of the measurement cell a. if a particle is present, and the tensile intensity is high enough, cavitation occurs i. Result of the measurement: a particle is detected with this wave b. If there is no particle, or if the tensile intensity is not high enough, there is no cavitation i. Result of the measurement: either the liquid sample is homogeneous, ii. Or there are smaller particles which are not detected by the current wave.

5. The waveform emitter/receiver module treats any waveform captured by the transducer after the acoustic pulse. In the case 4.a, it corresponds to the echo of cavitation. In the case 4.b, the waveform corresponds to noise.

6. The result is returned to the central PC.

The invention has advantages over existing methods for liquid purity measurements as mentioned above.

Figure 4:
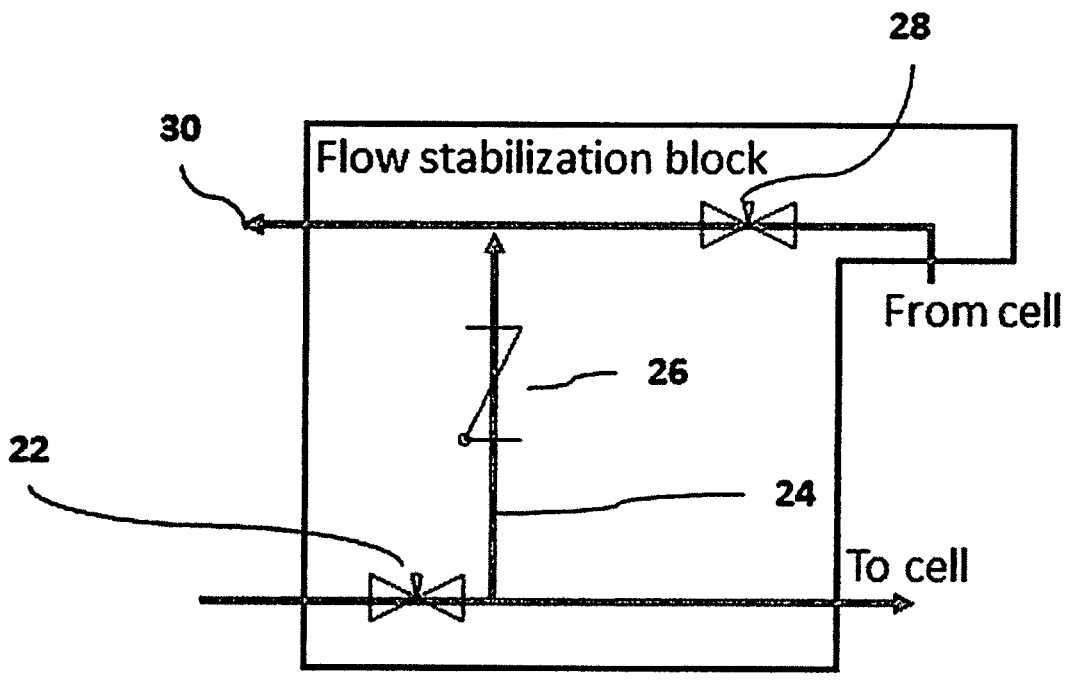
FIG. 4 is a schematic showing a form of flow stabilization apparatus forming a part of the invention.

One key advantage of the invention lies in the stabilization of the sample flow. Without flow control, measurements can be misinterpreted due to external flow variations which are possible in liquid piping systems. The flow stabilization mechanism 20 is shown in FIG. 4 and is composed of an upstream flow restrictor 22, a line 24 bypassing the measurement cell, a check valve 26 in the line 24, and a downstream flow restrictor 28 in a line from the cell. The upstream flow restrictor protects the cell against overpressure (or pressure surges) and smoothes out pressure fluctuations that can potentially happen in the flowing medium. The bypass line 24 starts between the upstream flow restrictor 22 and the measurement cell 1, and passes to a drain 30. The check-valve is set to open at a desired cracking pressure. When the medium pressure is higher than the cracking pressure, the check valve opens, dispensing thereby excess sample flow to the drain 30 through the bypass line 24. Consequently, only a stable amount of flow goes through the cell 1. This amount is determined by the downstream flow restrictor 28.

Alternatively, there exist two other regulation techniques: downstream pressure regulator or upstream (or backpressure) regulator. The presented system has two main advantages compared to these techniques: it does not require a consumable for active regulation (such as compressed air) and does not generate pressure oscillations such as in spring-based mechanisms. The control and monitoring of the flow guarantees stable cavitation conditions and repeatable measurements.

The invention implements a compact and energy-efficient waveform generator module, which reduces significantly the overall footprint. This allows the use of replicates of the transducer and measurement cells, as indicated by the dotted line and the reference number 8 in FIG. 2. In comparison to an analogue RF generator, the presented pulse generation solution has a 50% smaller footprint. Using four measurement systems with a single central PC unit would lead to an even more significant footprint reduction (70%). Thus, one can apply different acoustic parameters (intensity, pulse rate, duty cycle) on different liquid samples simultaneously. This approach leads to a better interpretability of the measurements than using successive pulses with changing acoustic parameters.

There are also advantages of the ACIM method compared to other metrologies of particle detection.

The use of a measurement cell with a flowing liquid medium allows continuous and on-line monitoring of the liquid, unlike batch measurements such as Dynamic Light Scattering (DLS) or Scanning Electronic Microscopic (SEM).

In addition, the acoustic cavitation-based measurement allows detection of particles as small as a few nanometers in diameter, as indicated earlier by the Laplace law. The limit of detectable size is dictated by the maximum acoustic intensity reachable in the focus zone provided that the acoustic pressure is below the tensile strength of water calculated and measured at around 120 MPa in specialized literature.

Another important feature over existing devices is that transducer-based sensors are not vulnerable to contamination, unlike the sensors of the commercially available optical counters. These often need to be sent back for maintenance due to sensor contamination. The current invention can be made free of this vulnerability.

The addition of a flow and pressure stabilization mechanism to the measurement cell is the main novel feature of the invention.

In addition, the invention features a custom made waveform generator to allow sending high-frequency high-voltage signals to the transducer in a compact housing connected close to the transducer. The reduced footprint enables the use of several measurement cells with their respective transducers and waveform generators in parallel. This approach, used to measure different particle sizes simultaneously, as well as the control of these multiple units with a single central PC are new features of the invention compared to prior art.

Several components of the invention can be modified to improve its efficiency or to be implemented in new areas of application. The top and side openings 3 of the measurement cell 1 can be advantageously used to integrate external equipment to improve the measurement accuracy and sensitivity of the invention. These optional accessories are aligned confocally with the main transducer 4 to be effective.

In one embodiment, the external equipment is any type of hydrophone plunged into the measurement cell 1 through the top opening 2. The hydrophone measures in situ the actual acoustic pressure in the focus zone during operation and can assess any variation of the acoustic pressure during operation. This improves accuracy of the measurements. Optical equipment could also be used, i.e. a high-yield imaging system.

The embodiments above are not restricted to the cylindrical measurement cell 1 with the openings 2 and 3 proposed. The shape of the measurement cell 1 need not be of same diameter as the transducer and can have more than one opening depending on the requirements of the application. In particular, the liquid medium can flow in any direction from an inlet opening to an outlet opening in the measurement cell.

Alternatively to the measurement cell 1, an embodiment of the invention integrates the main transducer directly into a pipe of the liquid medium where acoustic cavitation events are to be measured. The transducer can be spherical or cylindrical. In the latter case, the transducer generates acoustic cavitation in a line centered in the pipe and detects the cavitation events following the pulse-echo method described in the prior art.

In all embodiments above, the liquid medium is not restricted to water. It can be any chemical of interest, especially the ones required to have high purity as in the semiconductor application. The wetted surface of the measurement cell and the impedance matching layer of the transducer should be chosen to be chemically compatible with the liquid media. The nominal flow and pressure of the medium as well as the acoustic parameters must be adapted depending on the chemical type.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. An acoustic particle counter for nanoparticles in liquid, comprising:

at least one sensor unit positioned to receive a flow of liquid, flow control means upstream of the sensor unit for providing a constant, stable rate of flow of the liquid to each sensor unit, each sensor unit comprising a measurement cell having inlet and outlet openings for a continuous flow of the liquid through the cell, a transducer module engaged with the measurement cell in position to deliver an acoustic pulse into the liquid as the liquid flows through the cell such that the acoustic pulse is at a known preselected level of intensity and acts on the liquid at a focus zone to cause cavitation in the liquid in the event a particle of a minimum size detectable at that level of intensity is present, a waveform emitter/receiver module connected to each sensor unit to send a high-frequency, high-voltage signal to the transducer module causing the transducer module to send said acoustic pulse, and also to receive a waveform echo of cavitation in the event of a cavitation in the liquid, thus to detect the cavitation, and a microprocessor connected to each waveform emitter/receiver module to send controlled signals to the waveform emitter/receiver module at a known level to cause an acoustic pulse of said preselected level of intensity, and to receive signals from the waveform emitter/receiver module for analysis and detection of whether a cavitation occurred in the liquid as a result of the acoustic pulse sent.

2. The acoustic particle counter of claim 1, wherein the liquid on entry to the measurement cell is at a pressure slightly above atmospheric pressure, in a range of about 0.1 to 3 bar (about 1.4 to 43 psig).

3. The acoustic particle counter of claim 1, wherein the high-voltage signal is at a range of about 10 to 1000 volts peak.

4. The acoustic particle counter of claim 1, wherein the high-frequency of the signal is in a range of about 0.5 to 2 MHz.

5. The acoustic particle counter of claim 1, wherein the flow control means comprises a set of flow restrictors, a bypass line with a check valve, a flow sensor and a pressure sensor.

6. The acoustic particle counter of claim 1, wherein the waveform emitter/receiver module includes a high-voltage power switch, the power switch being a gallium nitride power switch for efficient and cost-effective waveform generation, and a matching network between the switch and the transducer to reduce power losses.

7. An acoustic particle counter for nanoparticles in liquid, comprising:

at least two sensor units positioned to receive a flow of liquid, flow control means for providing a constant, stable rate of flow of the liquid to each sensor unit, each sensor unit comprising a measurement cell having inlet and outlet openings for a continuous flow of the liquid through the cell, a transducer module engaged with the measurement cell in position to deliver an acoustic pulse into the liquid as the liquid flows through the cell such that the acoustic pulse is at a known preselected level of intensity and acts on the liquid at a focus zone to cause cavitation in the liquid in the event a particle of a minimum size detectable at that level of intensity is present, the at least two said sensor units having the measurement cells of the sensor units arranged in parallel for detecting different-sized particles simultaneously, a waveform emitter/receiver module connected to each sensor unit to send a high-frequency, high-voltage signal to the transducer module causing the transducer module to send said acoustic pulse, and also to receive a waveform echo of cavitation in the event of a cavitation in the liquid, thus to detect the cavitation, and a microprocessor connected to both waveform emitter/receiver modules to send controlled signals to the waveform emitter/receiver modules each at a known level to cause an acoustic pulse of said preselected level of intensity, and to receive signals from the waveform emitter/receiver modules for analysis and detection of whether a cavitation occurred in the liquid as a result of the acoustic pulse sent.

8. A method for monitoring purity of a continuously flowing liquid medium by detection of quantity and size of sub-micron particles or impurities present in the liquid medium, comprising:

provide at least one sensor unit, positioned to receive a flow of the liquid medium, the sensor unit comprising a measurement cell having inlet and outlet openings providing continuous flow of the liquid medium through the cell, and a transducer module engaged with the measurement cell in position to deliver an acoustic pulse into the liquid as the liquid flows through the cell, providing a waveform emitter/receiver module connected to the sensor unit for sending a high-frequency, high-voltage signal to the transducer module causing the transducer module to send said acoustic pulse, and also to receive a waveform echo of cavitation in the event of a cavitation in the liquid, thus to detect the cavitation, controlling the flow of liquid medium through the measurement cell from upstream of the cell to provide a constant, stable pressure and rate of flow of the liquid medium through the measurement cell of the sensor unit, with essentially constant pressure, with a single controller including a microprocessor, the controller being connected to the waveform emitter/receiver module, sending a controlled signal to the waveform emitter/receiver module at known intensity level to cause delivery of an acoustic pulse of preselected intensity into the liquid as the liquid flows through the cell such that the acoustic pulse acts on the liquid at a focus zone to cause cavitation in the liquid in the event a particle is present and a cavitation event in the cell causes an echo which is detected by the waveform emitter/receiver, and at the controller receiving signals from the waveform emitter/receiver module for analysis and detection of whether a cavitation occurred in the liquid at the cell as a result of the acoustic pulse sent, to indicate presence of particles of particular size.

9. The method of claim 8, including maintaining the liquid in the sensor unit at a pressure in the range of 0.1 to 3 bar.

10. The method of claim 8, wherein the high-voltage signal is at a range of up to about 1000 volts.

11. The method of claim 8, wherein the high-frequency of the signal is in a range of about 0.5 to 2 MHz.

12. A method for monitoring purity of a continuously flowing liquid medium by detection of quantity and size of sub-micron particles or impurities present in the liquid medium, comprising:

providing at least two sensor units, positioned to receive a flow of the liquid medium, each sensor unit comprising a measurement cell having inlet and outlet openings providing continuous flow of the liquid medium through the cell, and a transducer module engaged with the measurement cell in position to deliver an acoustic pulse into the liquid as the liquid flows through the cell, providing a waveform emitter/receiver module connected to each sensor unit for sending a high-frequency, high-voltage signal to the transducer module causing the transducer module to send said acoustic pulse, and also to receive a waveform echo of cavitation in the event of a cavitation in the liquid, thus to detect the cavitation, controlling the flow of liquid medium through the measurement cell from upstream of the cell to provide a constant, stable pressure and rate of flow of the liquid medium through the measurement cell of the sensor unit, with essentially constant pressure, with a single controller including a microprocessor, the controller being connected to the waveform emitter/receiver modules, sending a controlled signal to the waveform emitter/receiver modules at known intensity level to cause delivery of an acoustic pulse of preselected intensity into the liquid as the liquid flows through the cell such that the acoustic pulse acts on the liquid at a focus zone to cause cavitation in the liquid in the event a particle is present and a cavitation event in the cell causes an echo which is detected by the waveform emitter/receiver, at the controller receiving signals from the waveform emitter/receiver module for analysis and detection of whether a cavitation occurred in the liquid at the cell as a result of the acoustic pulse sent, to indicate presence of particles of particular size, and the at least two said sensor units being in parallel, controlled by the single controller, and detecting particles of different sizes with the at least two sensor units by providing acoustic pulses of different known intensities in the multiple sensor units so as to cause cavitation events responsive to particles of different minimum sizes.

\* \* \* \* \*